T. H. RENAUD.
PISTON PACKING RING.
APPLICATION FILED APR. 3, 1908.
941,536.
Patented Nov. 30, 1909.
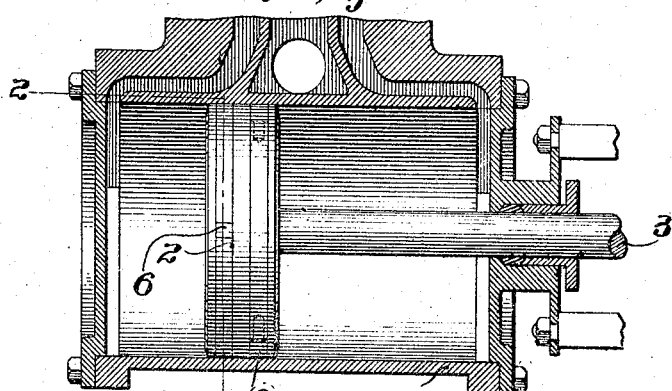
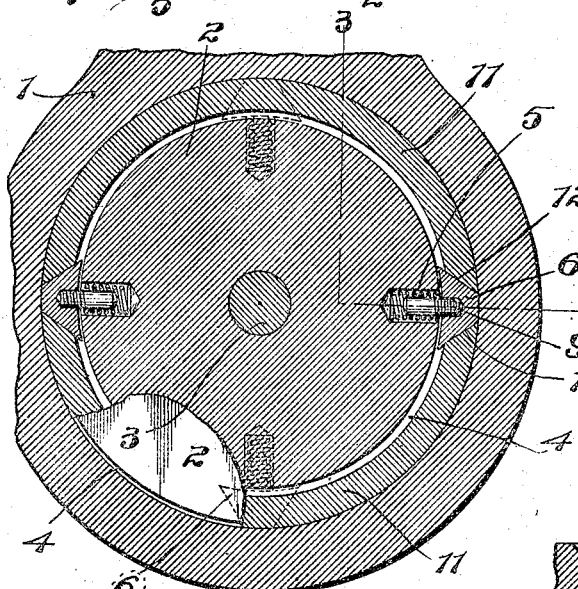
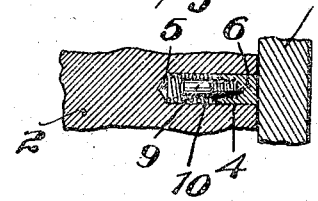
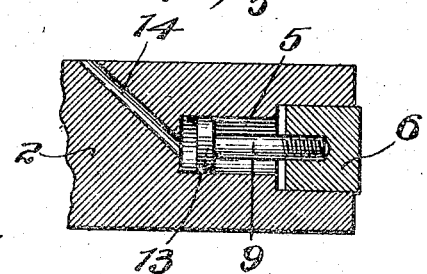
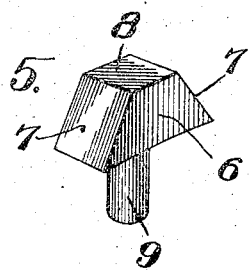
Attest.
Edgar T. Farmer
M. P. Smith
Inventor:-
Thomas H. Renaud,
By Rigdon Longan,
Attys

UNITED STATES PATENT OFFICE.

THOMAS H. RENAUD, OF ST. LOUIS, MISSOURI, ASSIGNOR OF ONE-THIRD TO WILLIAM BAWDEN AND ONE-THIRD TO EDWARD L. ADREON, JR., OF ST. LOUIS, MISSOURI.

PISTON-PACKING RING.

941,536.　　　　　　Specification of Letters Patent.　　Patented Nov. 30, 1909.

Application filed April 3, 1908. Serial No. 425,039.

*To all whom it may concern:*

Be it known that I, THOMAS H. RENAUD, citizen of the United States, and resident of St. Louis, Missouri, have invented certain new and useful Improvements in Piston-Packing Rings, of which the following is a specification containing a full, clear, and exact description, reference being had to the accompanying drawings, forming a part hereof.

My invention relates to a piston packing ring, the object of my invention being to construct a simple, inexpensive packing ring adapted to be seated in the periphery of a piston, and which ring is continuously forced outward against the inner surface of the cylinder in which the piston is operating, in order to form a perfectly tight joint between the piston and cylinder, and which packing ring is so constructed as that the outward pressure is evenly distributed over its entire outer face, thereby evenly distributing the wear on said outer face.

To the above purposes, my invention consists in certain novel features of construction and arrangement of parts, which will be hereinafter more fully set forth, pointed out in the claims, and illustrated in the accompanying drawings, in which:

Figure 1 is a vertical section taken longitudinally through the center of a cylinder with the pitson therein, and showing the piston equipped with my improved packing rings; Fig. 2 is an enlarged section taken approximately on the line 2—2 of Fig. 1; Fig. 3 is a horizontal section taken approximately on the line 3—3 of Fig. 2; Fig. 4 is a detail section taken through the edge of a piston equipped with a modified form of the packing ring; and Fig. 5 is a perspective view of one of the wedge blocks utilized in connection with the packing ring.

Referring by numerals to the accompanying drawings: 1 designates a cylinder of ordinary construction, in which is arranged to reciprocate the usual piston 2, carried on the end of the piston rod 3. Formed in the periphery of the piston is one or more continuous grooves 4, and formed in the body of the piston and extending toward the center thereof from the bottom of each groove is a pair of oppositely arranged recesses 5, and arranged in each groove, immediately over these recesses, are wedge blocks 6, each provided with a pair of oppositely disposed inclined or beveled faces 7, the outer face 8 of each wedge block being curved to conform with the curvature of the inner face of the cylinder 1. Formed on or fixed to the under side of each wedge block is a pin 9, which extends into the corresponding recess 5, and located on each pin within the recess is an expansive coil spring 10.

Each packing ring is made up of a pair of semicircular sections 11, each of which sections is rectangular in cross section, and adapted to fit snugly in the groove 4 and the ends of each section 11 are inclined or beveled, as designated by 12, in order to correspond with and fit upon the inclined faces 7 of the wedge blocks 6. The ring sections are preferably constructed of hard metal, and previous to their being fitted into the piston the outer faces of said ring sections are turned or formed to fit the inner face of the cylinder. When my improved packing rings are fitted into a piston and said piston is in operation, the expansive power of the coil springs 10 forces the wedge blocks 6 outward until the outer faces 8 of said wedge blocks bear against the inner face of the cylinder, and this continuous outward pressure of said wedge blocks exerts a continuous outward pressure on the ring sections 11, owing to the engagement of the inclined faces 7 against the corresponding inclined faces 12 on the ends of said ring sections, and thus the entire outer surfaces or peripheries of the ring sections are held snugly against the inner surface of the cylinder, thus forming a tight joint between the piston and said cylinder. Each ring is constructed in two sections, and as the pressure on both sections is equal, the wear upon the peripheries of the ring sections and upon the inner surface of the cylinder is equalized. When two or more packing rings are arranged in a piston, the blocks 6 of the adjacent rings are offset or staggered relative to one another, thus breaking joint between the ends of the adjacent pairs of the main sections.

In Fig. 4 I have shown the pin 9 provided with a head or piston 13, which operates in the recess 5, and formed through the piston and communicating with the end of said recess 5 is an aperture 14, which admits steam or other fluid pressure to the recess 5 behind the head or piston 13, and thus fluid pressure with the cylinder is utilized to force the wedge block 6 outward.

My improved packing ring is very simple and inexpensive, can be turned up so that its periphery is in the form of a true circle, and when the piston is in operation the pressure of the ring against the inner surface of the cylinder is equalized over the entire face or periphery of said ring.

The ring sections 11, together with the wedge blocks 6, combine to form a complete ring which extends entirely around the periphery of the piston, and the entire bearing surface of which ring is always in contact with the inner face of the cylinder, thereby forming a perfect packing, which is not available where a split ring is used, owing to the fact that a split ring will gradually expand as the piston and piston ring wears and thus form an opening between the ends of said split ring, through which steam or air can readily pass. In some instances it may be found advantageous to use a single split ring, the ends of which are beveled, and between which beveled ends is positioned one of the wedge blocks.

I claim:

1. The combination with a piston head having a continuous groove formed therein, of a pair of semi-circular packing rings seated in said groove, the inner edges of which are spaced apart from the bottom wall of said groove, the ends of each ring being inclined inwardly from its outer edge, a pair of wedge blocks seated in said groove between the ends of said semi-circular rings, which wedge blocks entirely separate said semi-circular rings from the outer edge of said blocks, completing the arcs of the circle between said rings, and a spring positioned beneath each of said wedge blocks for forcing the wedge blocks and the ring positioned between said wedge blocks outwardly.

2. A piston rod packing, comprising a pair of semi-circular members, the ends of which semi-circular members are beveled inwardly from their outer edges, wedge-shaped blocks arranged between the ends of said semi-circular rings and completely separating said rings and the outer face of said blocks completing the circle between the ends of said rings, and a spring positioned beneath each wedge block for forcing the wedge block and the ring positioned between the wedge blocks outwardly.

In testimony whereof, I have signed my name to this specification, in presence of two subscribing witnesses.

THOMAS H. RENAUD.

Witnesses:
M. P. SMITH,
WM. BAWDEN.